(12) United States Patent
Cova et al.

(10) Patent No.: US 8,432,274 B2
(45) Date of Patent: Apr. 30, 2013

(54) CONTEXTUAL BASED DETERMINATION OF ACCURACY OF POSITION FIXES

(75) Inventors: Nicholas D. Cova, Salt Lake City, UT (US); Narayana C. Krishna, Cupertino, CA (US)

(73) Assignees: Deal Magic, Inc., Edmonds, WA (US); Savi Networks, Inc., Alexandria, VA (US)

( * ) Notice: Subject to any disclaimer, the term of this patent is extended or adjusted under 35 U.S.C. 154(b) by 714 days.

(21) Appl. No.: 12/533,913

(22) Filed: Jul. 31, 2009

(65) Prior Publication Data

US 2011/0025496 A1 Feb. 3, 2011

(51) Int. Cl.
 *G08B 1/08* (2006.01)

(52) U.S. Cl.
 USPC ........... 340/539.13; 340/539.1; 340/572.1; 340/988; 342/357.23; 342/457; 701/468; 701/469; 705/22; 705/28

(58) Field of Classification Search ............. 340/539.13, 340/539.1, 988, 572.1; 705/22, 8, 28; 701/207, 701/213, 214, 300; 342/357.23, 457
See application file for complete search history.

(56) References Cited

U.S. PATENT DOCUMENTS

| 690,191 | A | 12/1901 | Saxe |
|---|---|---|---|
| 3,993,987 | A | 11/1976 | Stevens |
| 4,233,595 | A | 11/1980 | Landkammer |
| 4,729,626 | A | 3/1988 | Stieff |
| 4,736,857 | A | 4/1988 | Monico, Jr. et al. |
| 5,151,684 | A | 9/1992 | Johnsen |
| 5,189,396 | A | 2/1993 | Stobbe et al. |
| 5,266,925 | A | 11/1993 | Vercellotti et al. |
| 5,483,666 | A | 1/1996 | Yamada et al. |
| 5,491,486 | A | 2/1996 | Welles et al. |
| 5,515,030 | A | 5/1996 | Citron et al. |
| 5,565,858 | A | 10/1996 | Guthrie |
| 5,656,996 | A | 8/1997 | Houser |
| 5,710,973 | A | 1/1998 | Yamada et al. |
| 5,752,218 | A | 5/1998 | Harrison et al. |
| 5,758,263 | A | 5/1998 | Berger et al. |
| 5,774,876 | A | 6/1998 | Woolley et al. |
| 5,798,460 | A | 8/1998 | Nakagawa et al. |
| 5,815,407 | A | 9/1998 | Huffman et al. |

(Continued)

FOREIGN PATENT DOCUMENTS

| GB | 2 368 174 A | 4/2002 |
|---|---|---|
| GB | 2 448 482 A | 10/2008 |

(Continued)

OTHER PUBLICATIONS

International Search Report and Written Opinion of the International Searching Authority, PCT Application Serial No. PCT/US2010/043795, Sep. 17, 2010, 11 pp.

(Continued)

*Primary Examiner* — Brent Swarthout
(74) *Attorney, Agent, or Firm* — Fish & Richardson P.C.

(57) ABSTRACT

Techniques for contextual based determination of accuracy of position fixes, and modification of the position fixes in accordance with the accuracy are disclosed. In one aspect, a position fix for an asset is received. The first position fix corresponds to a location of an event during shipment of the asset. If it is determined that the position fix is inaccurate, the position fix is modified in accordance with a type of the event.

15 Claims, 6 Drawing Sheets

U.S. PATENT DOCUMENTS

| | | |
|---|---|---|
| 5,827,965 A | 10/1998 | Nakagawa et al. |
| 5,861,810 A | 1/1999 | Nguyen |
| 5,959,529 A | 9/1999 | Kail, IV |
| 6,026,690 A | 2/2000 | Nakagawa et al. |
| 6,069,563 A | 5/2000 | Kadner et al. |
| 6,075,443 A | 6/2000 | Schepps et al. |
| 6,243,005 B1 | 6/2001 | Haimovich et al. |
| 6,249,252 B1 | 6/2001 | Dupray |
| 6,265,973 B1 | 7/2001 | Brammall et al. |
| 6,292,108 B1 | 9/2001 | Straser et al. |
| 6,420,971 B1 | 7/2002 | Leck et al. |
| 6,496,766 B1 | 12/2002 | Bernold et al. |
| 6,529,131 B2 | 3/2003 | Wentworth |
| 6,571,213 B1 | 5/2003 | Altendahl et al. |
| 6,727,817 B2 | 4/2004 | Maloney |
| 6,753,775 B2 | 6/2004 | Auerbach et al. |
| 6,778,083 B2 | 8/2004 | Auerbach et al. |
| 6,792,353 B2 | 9/2004 | Lin |
| 6,879,962 B1 | 4/2005 | Smith et al. |
| 6,927,688 B2 | 8/2005 | Tice |
| 6,965,313 B1 | 11/2005 | Saylor et al. |
| 6,972,682 B2 | 12/2005 | Lareau et al. |
| 6,990,335 B1 | 1/2006 | Shamoon et al. |
| 7,035,856 B1 | 4/2006 | Morimoto |
| 7,044,374 B2 | 5/2006 | Allison et al. |
| 7,072,668 B2 | 7/2006 | Chou |
| 7,098,784 B2 | 8/2006 | Easley et al. |
| 7,106,244 B2 | 9/2006 | Hsu |
| 7,113,090 B1 | 9/2006 | Saylor et al. |
| 7,136,830 B1 | 11/2006 | Kuelbs et al. |
| 7,136,832 B2 | 11/2006 | Li et al. |
| 7,164,986 B2 | 1/2007 | Humphries et al. |
| 7,193,557 B1 | 3/2007 | Kovacich et al. |
| 7,196,621 B2 | 3/2007 | Kochis |
| 7,212,829 B1 | 5/2007 | Lau et al. |
| 7,239,238 B2 | 7/2007 | Tester et al. |
| 7,257,397 B2 | 8/2007 | Shamoon et al. |
| 7,274,332 B1 | 9/2007 | Dupray |
| 7,275,651 B2 | 10/2007 | Morales et al. |
| 7,286,683 B2 | 10/2007 | Hadell |
| 7,298,327 B2 | 11/2007 | Dupray et al. |
| 7,312,752 B2 | 12/2007 | Smith et al. |
| 7,315,281 B2 | 1/2008 | Dejanovic et al. |
| 7,336,152 B2 | 2/2008 | Horwitz et al. |
| 7,336,170 B2 | 2/2008 | Auerbach et al. |
| 7,339,469 B2 | 3/2008 | Braun |
| 7,350,383 B1 | 4/2008 | Kuo |
| 7,382,251 B2 | 6/2008 | Bohman et al. |
| 7,385,500 B2 | 6/2008 | Irwin |
| 7,385,529 B2 | 6/2008 | Hersh et al. |
| 7,391,321 B2 | 6/2008 | Twitchell, Jr. |
| 7,394,361 B1 | 7/2008 | Twitchell, Jr. |
| 7,423,535 B2 | 9/2008 | Chung et al. |
| 7,467,032 B2 | 12/2008 | Kane et al. |
| 7,471,203 B2 | 12/2008 | Worthy et al. |
| 7,482,920 B2 | 1/2009 | Joao |
| RE40,642 E | 2/2009 | Harrison et al. |
| 7,498,938 B2 | 3/2009 | Ulrich |
| 7,499,997 B2 | 3/2009 | Hancock et al. |
| 7,525,484 B2 | 4/2009 | Dupray et al. |
| 7,536,321 B2 | 5/2009 | Takahashi et al. |
| 7,616,116 B2 | 11/2009 | Ehrensvard et al. |
| 7,623,033 B2 | 11/2009 | Ainsworth et al. |
| 7,639,131 B2 | 12/2009 | Mock et al. |
| 7,643,823 B2 | 1/2010 | Shamoon et al. |
| 7,652,576 B1 | 1/2010 | Crossno et al. |
| 7,668,532 B2 | 2/2010 | Shamoon et al. |
| 7,688,207 B2 | 3/2010 | Fritchie et al. |
| 7,707,076 B1 | 4/2010 | Whiteley et al. |
| 7,714,778 B2 | 5/2010 | Dupray |
| 7,724,138 B2 | 5/2010 | Horwitz et al. |
| 7,746,228 B2 | 6/2010 | Sensenig et al. |
| 7,760,103 B2 | 7/2010 | Frank |
| 7,764,231 B1 | 7/2010 | Karr et al. |
| 7,822,580 B2 | 10/2010 | Mustonen |
| 7,830,852 B2 | 11/2010 | Twitchell, Jr. |
| 7,853,480 B2 | 12/2010 | Taylor et al. |
| 7,864,061 B2 | 1/2011 | Frank |
| 7,903,029 B2 | 3/2011 | Dupray |
| 7,936,266 B2 | 5/2011 | Francis et al. |
| 7,937,244 B2 | 5/2011 | Kadaba |
| 7,973,536 B2 | 7/2011 | Kojovic et al. |
| 7,990,270 B2 | 8/2011 | Mostov |
| 7,990,947 B2 | 8/2011 | Twitchell et al. |
| 8,032,153 B2 | 10/2011 | Dupray et al. |
| 8,064,935 B2 | 11/2011 | Shamoon et al. |
| 8,068,023 B2 | 11/2011 | Dulin et al. |
| 8,082,094 B2 * | 12/2011 | Gao ............................ 701/446 |
| 8,082,096 B2 | 12/2011 | Dupray |
| 8,135,413 B2 | 3/2012 | Dupray |
| 8,164,458 B2 | 4/2012 | Mostov |
| 8,217,785 B2 | 7/2012 | Steer |
| 8,228,192 B2 | 7/2012 | Eckert et al. |
| 2001/0022558 A1 | 9/2001 | Karr et al. |
| 2002/0104013 A1 | 8/2002 | Ghazarian |
| 2002/0111819 A1 | 8/2002 | Li et al. |
| 2002/0113704 A1 | 8/2002 | Hess |
| 2003/0126024 A1 | 7/2003 | Crampton et al. |
| 2003/0137968 A1 | 7/2003 | Lareau et al. |
| 2003/0146871 A1 | 8/2003 | Karr et al. |
| 2003/0171948 A1 | 9/2003 | Thomas et al. |
| 2003/0195791 A1 | 10/2003 | Waller et al. |
| 2003/0222820 A1 | 12/2003 | Karr et al. |
| 2003/0227392 A1 | 12/2003 | Ebert et al. |
| 2003/0233189 A1 | 12/2003 | Hsiao et al. |
| 2004/0113933 A1 | 6/2004 | Guler |
| 2004/0124977 A1 | 7/2004 | Biffar |
| 2004/0126015 A1 | 7/2004 | Hadell |
| 2004/0183673 A1 | 9/2004 | Nageli |
| 2004/0198386 A1 | 10/2004 | Dupray |
| 2004/0199411 A1 | 10/2004 | Bertram et al. |
| 2004/0227630 A1 | 11/2004 | Shannon et al. |
| 2004/0246130 A1 | 12/2004 | Lambright et al. |
| 2004/0257225 A1 | 12/2004 | Webb, Sr. |
| 2004/0266457 A1 | 12/2004 | Dupray |
| 2005/0055237 A1 | 3/2005 | Schmidtberg et al. |
| 2005/0091091 A1 | 4/2005 | Bjerre et al. |
| 2005/0156736 A1 | 7/2005 | Rajapakse et al. |
| 2005/0159883 A1 | 7/2005 | Humphries et al. |
| 2005/0190097 A1 | 9/2005 | Hsu |
| 2005/0219037 A1 | 10/2005 | Huang et al. |
| 2005/0248454 A1 | 11/2005 | Hanson et al. |
| 2005/0256731 A1 | 11/2005 | Mougey et al. |
| 2006/0047379 A1 | 3/2006 | Schullian et al. |
| 2006/0054705 A1 | 3/2006 | Garton et al. |
| 2006/0101897 A1 | 5/2006 | Masuya et al. |
| 2006/0105760 A1 | 5/2006 | Shamoon et al. |
| 2006/0109109 A1 | 5/2006 | Rajapakse et al. |
| 2006/0116893 A1 | 6/2006 | Carnes et al. |
| 2006/0145837 A1 | 7/2006 | Horton et al. |
| 2006/0155591 A1 | 7/2006 | Altaf et al. |
| 2006/0202824 A1 | 9/2006 | Carroll et al. |
| 2006/0229895 A1 | 10/2006 | Kodger |
| 2006/0232398 A1 | 10/2006 | Nedblake et al. |
| 2006/0238332 A1 | 10/2006 | Carle et al. |
| 2006/0255934 A1 | 11/2006 | Easley et al. |
| 2006/0276201 A1 | 12/2006 | Dupray |
| 2006/0288744 A1 | 12/2006 | Smith |
| 2007/0043538 A1 | 2/2007 | Johnson et al. |
| 2007/0046459 A1 | 3/2007 | Silverman et al. |
| 2007/0056369 A1 | 3/2007 | Griffin et al. |
| 2007/0115902 A1 | 5/2007 | Shamoon et al. |
| 2007/0120381 A1 | 5/2007 | Ehrensvard et al. |
| 2007/0145130 A1 | 6/2007 | Danilewitz |
| 2007/0150379 A1 | 6/2007 | Vernaci et al. |
| 2007/0155379 A1 | 7/2007 | Shamoon et al. |
| 2007/0167179 A1 | 7/2007 | Shamoon et al. |
| 2007/0182556 A1 | 8/2007 | Rado et al. |
| 2007/0222232 A1 | 9/2007 | Held |
| 2007/0222674 A1 | 9/2007 | Tan et al. |
| 2007/0252696 A1 | 11/2007 | Belisle et al. |
| 2007/0262861 A1 | 11/2007 | Anderson et al. |
| 2007/0285232 A1 | 12/2007 | Bohman et al. |
| 2007/0287473 A1 | 12/2007 | Dupray |
| 2008/0006696 A1 | 1/2008 | Piersol et al. |
| 2008/0040244 A1 | 2/2008 | Ricciuti et al. |
| 2008/0042809 A1 | 2/2008 | Watts et al. |

| | | |
|---|---|---|
| 2008/0086391 A1 | 4/2008 | Maynard et al. |
| 2008/0094209 A1 | 4/2008 | Braun et al. |
| 2008/0111693 A1 | 5/2008 | Johnson et al. |
| 2008/0113672 A1 | 5/2008 | Karr et al. |
| 2008/0133126 A1 | 6/2008 | Dupray |
| 2008/0143516 A1 | 6/2008 | Mock et al. |
| 2008/0143604 A1 | 6/2008 | Mock et al. |
| 2008/0150698 A1 | 6/2008 | Smith et al. |
| 2008/0157974 A1 | 7/2008 | Boss et al. |
| 2008/0167049 A1 | 7/2008 | Karr et al. |
| 2008/0186166 A1 | 8/2008 | Zhou et al. |
| 2008/0231459 A1 | 9/2008 | Corder |
| 2008/0248813 A1 | 10/2008 | Chatterjee et al. |
| 2008/0252428 A1 | 10/2008 | Robinson et al. |
| 2008/0309487 A1 | 12/2008 | Chao |
| 2009/0030715 A1 | 1/2009 | Robb et al. |
| 2009/0060349 A1* | 3/2009 | Linaker et al. ............... 382/209 |
| 2009/0083123 A1 | 3/2009 | Powell et al. |
| 2009/0102657 A1 | 4/2009 | Evans et al. |
| 2009/0102660 A1 | 4/2009 | Evans et al. |
| 2009/0121877 A1 | 5/2009 | Henderson |
| 2009/0134999 A1 | 5/2009 | Dobson et al. |
| 2009/0135000 A1 | 5/2009 | Twitchell, Jr. |
| 2009/0135015 A1 | 5/2009 | Dobson et al. |
| 2009/0140886 A1 | 6/2009 | Bender |
| 2009/0146805 A1 | 6/2009 | Joao |
| 2009/0146832 A1 | 6/2009 | Ebert et al. |
| 2009/0167536 A1 | 7/2009 | Clark et al. |
| 2009/0177394 A1 | 7/2009 | Walz et al. |
| 2009/0201169 A1 | 8/2009 | d'Hont et al. |
| 2009/0216775 A1 | 8/2009 | Ratliff et al. |
| 2009/0234493 A1 | 9/2009 | Pandit et al. |
| 2009/0308000 A1 | 12/2009 | Corcoran |
| 2009/0316682 A1 | 12/2009 | Twitchell et al. |
| 2009/0322510 A1 | 12/2009 | Berger et al. |
| 2009/0326971 A1 | 12/2009 | Piccinini et al. |
| 2010/0012653 A1 | 1/2010 | Ulrich et al. |
| 2010/0039284 A1 | 2/2010 | Hall et al. |
| 2010/0045436 A1 | 2/2010 | Rinkes |
| 2010/0066501 A1 | 3/2010 | Ulrich et al. |
| 2010/0066561 A1 | 3/2010 | Ulrich et al. |
| 2010/0073229 A1 | 3/2010 | Pattabiraman et al. |
| 2010/0076902 A1 | 3/2010 | Kraft |
| 2010/0090822 A1 | 4/2010 | Benson et al. |
| 2010/0095864 A1 | 4/2010 | Forbes |
| 2010/0102964 A1 | 4/2010 | Steer |
| 2010/0116932 A1 | 5/2010 | Helou, Jr. |
| 2010/0141393 A1 | 6/2010 | Daniel |
| 2010/0141445 A1 | 6/2010 | Venkatasubramaniyam et al. |
| 2010/0145739 A1 | 6/2010 | Erhart et al. |
| 2010/0234045 A1 | 9/2010 | Karr et al. |
| 2010/0238032 A1 | 9/2010 | Greene |
| 2010/0277280 A1 | 11/2010 | Burkart et al. |
| 2010/0312715 A1 | 12/2010 | Esque et al. |
| 2011/0012731 A1 | 1/2011 | Stevens |
| 2011/0050397 A1 | 3/2011 | Cova |
| 2011/0050423 A1 | 3/2011 | Cova et al. |
| 2011/0050424 A1 | 3/2011 | Cova et al. |
| 2011/0054979 A1 | 3/2011 | Cova et al. |
| 2011/0120199 A1 | 5/2011 | Auerbach et al. |
| 2011/0128143 A1 | 6/2011 | Daniel |
| 2011/0133888 A1 | 6/2011 | Stevens et al. |
| 2011/0133932 A1 | 6/2011 | Tan et al. |
| 2011/0258930 A1 | 10/2011 | Francis et al. |
| 2011/0266338 A1 | 11/2011 | Babcock et al. |
| 2011/0283750 A1 | 11/2011 | Will |
| 2011/0289320 A1 | 11/2011 | Twitchell et al. |
| 2012/0058775 A1 | 3/2012 | Dupray et al. |
| 2012/0069131 A1 | 3/2012 | Abelow |
| 2012/0094638 A1 | 4/2012 | Shamoon et al. |
| 2012/0182180 A1 | 7/2012 | Wolf et al. |
| 2012/0190380 A1 | 7/2012 | Dupray et al. |

FOREIGN PATENT DOCUMENTS

| | | |
|---|---|---|
| NZ | 541176 A | 8/2005 |
| WO | WO 03/098175 | 11/2003 |
| WO | WO 2007/121508 | 11/2007 |
| WO | WO 2010/077688 | 7/2010 |
| WO | WO 2011/008871 | 1/2011 |
| WO | WO 2011/008884 | 1/2011 |
| WO | WO 2011/022412 | 2/2011 |
| WO | WO 2011/025821 | 3/2011 |
| WO | WO 2011/025829 | 3/2011 |
| WO | WO 2011/025987 | 3/2011 |

OTHER PUBLICATIONS

U.S. Appl. No. 13/569,862, filed Aug. 8, 2012, Cova et al.
U.S. Appl. No. 13/569,884, filed Aug. 8, 2012, Cova et al.
International Search Report and Written Opinion of the International Searching Authority, PCT Application Serial No. PCT/US2009/067210, received Feb. 4, 2010, 9 pp.
International Preliminary Report on Patentability, PCT Application Serial No. PCT/US2009/067210, received Jun. 23, 2011, 8 pp.
International Search Report and Written Opinion of the International Searching Authority, PCT Application Serial No. PCT/US2010/041994 filed Jul. 14, 2010, received Sep. 14, 2010, 12 pp.
International Preliminary Report on Patentability, PCT Application Serial No. PCT/US2010/041994 filed Jul. 14, 2010, received Jan. 17, 2012, 11 pp.
International Search Report and Written Opinion of the International Searching Authority, PCT Application Serial No. PCT/US2010/047042 filed Aug. 27, 2010, received Dec. 27, 2010, 11 pp.
International Preliminary Report on Patentability, PCT Application Serial No. PCT/US2010/047042 filed Aug. 27, 2010, received Feb. 28, 2012, 8 pp.
International Preliminary Report on Patentability, PCT Application Serial No. PCT/US2010/043795 filed Jul. 29, 2010, received Jan. 31, 2012, 9 pp.
International Search Report and Written Opinion of the International Searching Authority, PCT Application Serial No. PCT/US2010/045776 filed Aug. 17, 2010, received Oct. 8, 2010, 14 pp.
International Preliminary Report on Patentability, PCT Application Serial No. PCT/US2010/045776 filed Aug. 17, 2010, received Feb. 21, 2012, 9 pp.
International Search Report and Written Opinion of the International Searching Authority, PCT Application Serial No. PCT/US2010/042014 filed Jul. 14, 2010, Received Sep. 14, 2010, 8 pp.
International Preliminary Report on Patentability, PCT Application Serial No. PCT/US2010/042014 filed Jul. 14, 2010, Received Jan. 17, 2012, 7 pp.
International Search Report and Written Opinion of the International Searching Authority, PCT Application Serial No. PCT/US2010/046655, mailed Oct. 20, 2010, 9 pp.
International Preliminary Report on Patentability, PCT Application Serial No. PCT/US2010/046655, mailed Mar. 8, 2012, 8 pp.
International Search Report and Written Opinion of the International Searching Authority, PCT Application Serial No. PCT/US2010/046640 filed Aug. 25 2010, mailed Oct. 18, 2010, 9 pp.
International Preliminary Report on Patentability, PCT Application U.S. Appl. No. PCT/US2010/046640 filed Aug. 25 2010, mailed Mar. 6, 2012, 8 pp.
"Hercules "Zigbee" e-Seal Bolt". Bolt eSeal Electronic Seals—TydenBrooks. Retrieved from the internet: URL<URL: http://www.tydenbrooks.com/Products/Electronic-Seals/Bolt-eSeal.aspx>, Aug. 2, 2012. 2 pages.
Bajikar, Sundeep. "Trusted Platform Module (TPM) based Security on Notebook PCs—White Paper", Jun. 20, 2002, Mobile Platforms Group, Intel Corporation. Retrieved from the internet: URL <http://www.intel.com/design/mobile/platform/downloads/Trusted_Platform_Module_White_Paper.pdf>, Aug. 2, 2012. 20 pages.
Chin, Le-Pong, et al. "The Role of Electronic Container Seal (E-Seal) with RFID Technology in the Container Security Initiatives." Proceedings of the International Conference on MEMS, NANO and Smart Systems 2004. ICMENS. Aug. 25-27, 2004. pp. 116-120.
FAQ, Trusted Computing group—Developers. Retrieved from the Internet: URL<http://www.trustedcomputinggroup.org/faq/TPMFAQ/>, Oct. 19, 2010. 2 pages.
GlobalTrak, "GlobalTrak+ Asset Monitoring Unit," 2 pages.
Liaw, M. and Cova, N., "Data Quality Delivered," A Savi Networks White Paper, copyright 2006, 19 pages.
Maersk Line, "Maersk Line Shipping Containers Worldwide". Retrieved from internet: URL<http://www.maerskline.com/link/

?page=brochure&path=/our_services/our_e-commerce_services/maerskline.com/the_shipping_process/tracking>, dated Aug. 19, 2009. 7 pages.

Reid Simmons et al., "Learning to Predict Driver Route and Destination Intent", Sep. 17-20, 2006, Proceedings of the 2006 IEEE Intelligent Transportation System Conference, pp. 127-132.

Siror, Joseph, et al. "Impact of RFID Technology on Tracking of Export Goods in Kenya." From Journal of Convergence Information Technology, vol. 5, No. 9. Nov. 2010. pp. 190-200.

* cited by examiner

CONTEXTUAL BASED DETERMINATION OF ACCURACY OF POSITION FIXES

TECHNICAL FIELD

This subject matter is related generally to determination of accuracy of position fixes.

BACKGROUND

A wireless monitoring and tracking electronic device (Tag), can use various technologies such as GPS, RFID, and GPRS to track movements of an asset on which the Tag is mounted. The Tag can monitor for various events affecting the asset and generate position fix data corresponding to the asset's position at the time the events occurred. However, this position fix data is not always accurate.

SUMMARY

Techniques for contextual based determination of accuracy of position fixes, and modification of the position fixes in accordance with the accuracy are disclosed. In one aspect, a first position fix for an asset is received, and the accuracy of the first position fix is determined. If the position fix is inaccurate, the position fix is modified based on a type of an event associated with the position fix. Events can include process events, security events, environmental events, and tracking events for the asset. Other implementations are disclosed which are directed to systems, methods, and apparatus including computer-readable mediums.

Particular embodiments of the subject matter described in this specification can be implemented to realize one or more of the following advantages. Position fixes can be adjusted according to business logic corresponding to a type of an event. More accurate position information can be provided to a user tracking an asset. Outlier position fixes can be identified and handled according to a type of corresponding event. False notifications (e.g., notifications generated because position fix data indicates an asset has moved when it has not) can be eliminated.

DETAILED DESCRIPTION

Example Tag System

Figure 1:
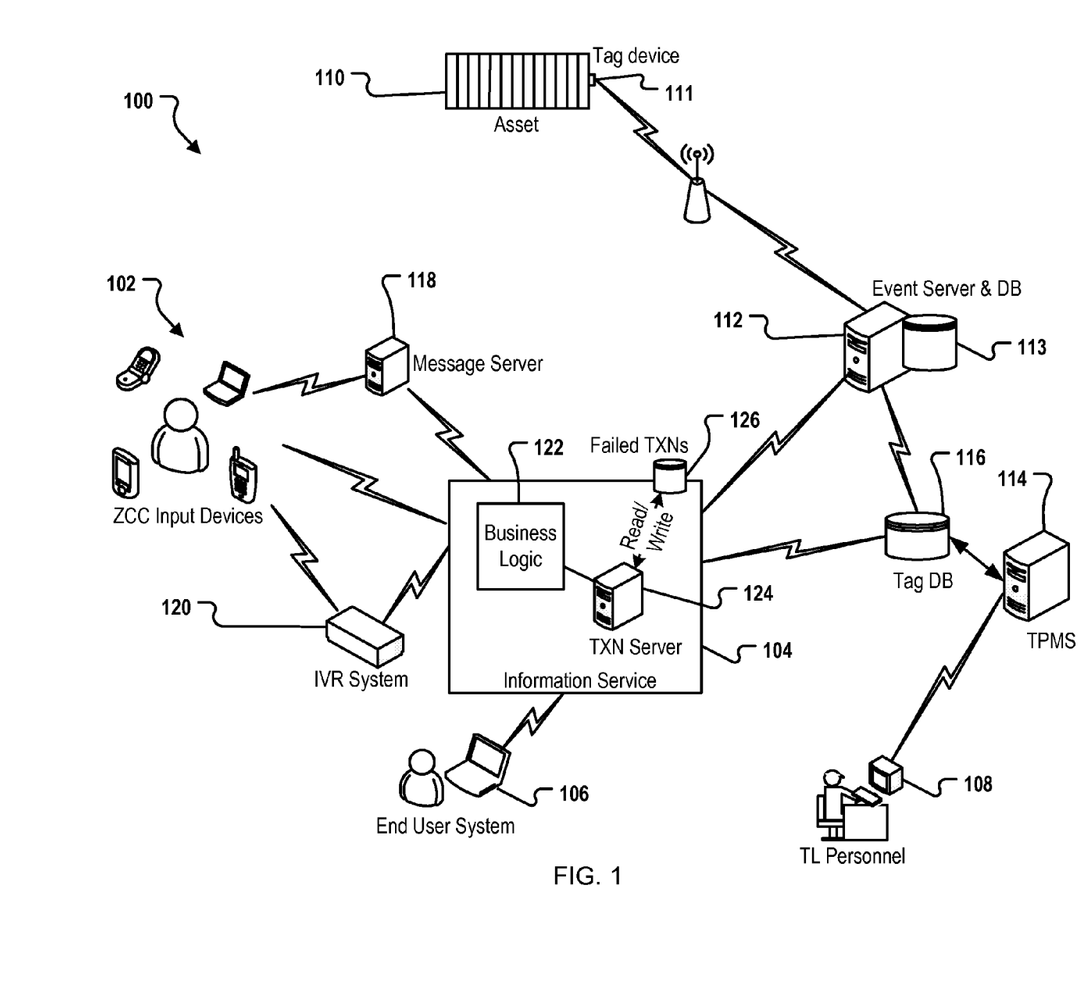
FIG. 1 is a block diagram of an example tag system that associates a Tag with an asset and monitors and tracks the asset using data received from the Tag.

FIG. 1 is a block diagram of an example tag system 100 that associates a Tag with an asset (e.g., a shipping container, equipment, or other devices capable of being tracked) and tracks the asset using data received from the Tag. The system 100 commissions (associates) Tags to assets, decommissions (disassociates) Tags from assets, provides notifications of events (e.g., security, environmental, process, and tracking events), and can reset tag status remotely.

In some implementations, the system 100 can include one or more ZCC input devices 102, an information service 104, one or more end user systems 106, Tag Logistics personnel (TL personnel) 108, one or more assets 110, one or more Tags 111 affixed or coupled to the one or more assets 110, an event server 112, an event database 113, a Tag Pool Management System (TPMS) 114, a tag database 116, a message server 118, an Integrated Voice Response (IVR) system 120, a transaction (TXN) server 124, and a failed transaction database 126.

The ZCC input devices 102 are used to commission and decommission Tags to assets. The ZCC input devices 102 can be any suitable communication device, including but not limited to mobile phones, land phones, email devices, and portable computers. The ZCC input devices 102 communicate with the information service 104 using a variety of communication modes, including but not limited to: IVR, Short Message Service (SMS), email, hand-held application, Web interface, and Electronic Data Interchange (EDI) or any other form of electronic message sharing. The ZCC input devices 102 can be operated by various actors having various roles in the supply chain, including but not limited to: dock workers, longshoreman, logistics service providers, freight forwarders, field agents, customs agents and any other personnel involved in the tracking of an asset.

The information service 104 allows end user systems 106 to track the status of assets 110 in real-time. The transaction server 124 runs a tracking application that receives event location/status transaction messages (e.g., event notifications) or reports from the event server 112 and applies business logic 122 to the transactions for validating and maintaining associations between Tag identifiers and asset identifiers. Successful transactions are posted against assets and Tags. Failed transactions and reason codes are written to an exception queue in the failed transaction database 126.

The information service 104 can include a Web server (not shown) for providing Web forms to end user systems 106 (e.g., a browser on a PC or mobile device). The Web forms provide an input mechanism for a user to commission or decommission Tags and to receive real-time tracking and status information regarding assets and events. An example information service 104 is SaviTrak™ provided by Savi Networks, LLC (Mountain View, Calif.).

The Tag 111 can be, for example, a GPS/GPRS electronic device that can be affixed or coupled to the asset being tracked. An example Tag 111 is the Savi Networks SN-LSE-01, which is a GPS-based Location+Security+Environmental Tag. The Tag 111 wakes up periodically to initiate communication with the event server 112 and to send event notifications to the event server 112. In general, each event notification includes an identification of the event (or event type), a location of the asset when the event occurred, and optionally additional details of the event such as a date and/or time when the event occurred, the status of the asset before, during, or after the event, or details on the movement of the asset (e.g., accelerometer or velocimeter readings from the Tag). The event information can be stored in the event database 113. The Tag 111 reports various events, including for example, security events, environmental events, process events, and tracking events. Security events indicate that the asset may have been tampered with. For example, the Tag 111 can report when a vertical or horizontal bolt securing the Tag 111 to a container is cut (indicating that the container was opened). Other types of tampers can also be detected (e.g., shock intrusion or illuminance inside the container that is beyond a threshold range, indicating that the container may have been opened). Environmental events indicate that one or more environmental variables (e.g., temperature, humidity, shock, acceleration) are beyond an acceptable range (e.g., a range specified by the user). Process events indicate that various procedural events in the journey of the asset have occurred. For example, process events can indicate that a Tag has been attached to a container or detached from a container (e.g., that an asset is beginning or ending its tagged journey). Process events can also indicate other shipment events in the journey of the asset (e.g., procedural events in the journey of the asset), including, but not limited to that an asset has been stuffed (e.g., filled with contents), that an asset has been sealed, that an asset has been flagged for customs inspection, that customs inspection of an asset has begun, that customs inspection of an asset has ended, that an asset is in a shipping yard, that an asset has left a shipping yard, that an asset has sailed, that an asset has been berthed, and that an asset has been unsealed. Tracking events are periodic reports of the Tag's 111 location. For example, the Tag 111 can send a report of its current location according to a schedule, for example, at fixed intervals of time, regardless of whether any other events have been issued. The system can process the tracking events to determine when an asset has entered or left a predefined area. For example, the system can define geofences (e.g., a virtual perimeter) around important locations along the journey of the asset (e.g., ports) and the Tag 111 can use these geofences and the location provided by the tracking events to determine when the Tag 111 enters or leaves a geofence.

The Tag 111 does not have to use GPS to determine its location, but can alternatively or additionally use various location techniques including, but not limited to: wireless networks, triangulation from cellular towers, or Skyhook Wireless™ technology. In some implementations, the Tag 111 also processes commands (e.g., Over-the-Air (OTA) commands) received from the event server 112 (e.g., during a communication session with the event server 112).

The event server 112 periodically receives event notifications from the Tag 111. The event server 112 also constructs and sends commands to the Tag 111. Some notification management functions performed by the event server 112 include but are not limited to: checking incoming notifications for syntax errors and population of mandatory fields, checking the accuracy of location information in incoming notifications, sorting or sequencing notifications logically before forwarding the notifications to the information service 104, and constructing output transactions that comply with processing logic. The event server can receive and stores GPS fixes. GPS fixes can be received during sessions. For example, a session can consist of a four hour window during which position fixes are received every half an hour. The event server 112 can maintain the position fixes from the previous session (or previous sessions) and can also maintain the last good fix (e.g., the last accurate fix received from the Tag, or a position fix whose location has been corrected by the system, for example, as described below with reference to FIG. 6.)

In some implementations, the TPMS 114 maintains an inventory of Tags 111 in the tag database 116. The TPMS 114 also maintains the association of the asset identifier (ID) and Tag ID and the logical state or status of the Tag 111, such as 'In Use,' 'Available,' 'Begin Journey', 'End Journey', etc. The TPMS 114 also maintains the allocation and availability of Tags 111 for logistics and pre-positioning purposes.

In some implementations, the TPMS 114 allows the TL personnel 108 to perform housekeeping functions, such as Tag forecasts, ordering new Tags, detecting lost Tags, billing management, salvage and environmental disposal of failed Tags, inventory tracking, customer help desk and financial accounting. The TPMS 114 allows the TL personnel 108 to monitor the state of a Tag 111 'in journey', trouble shoot causes for failure in communicating with the event server 112, and locate lost Tags. The TPMS 114 provides analytic tools to monitor Tag network performance (e.g., GPS/GPRS coverage/roaming area for trade lanes).

The tag system 100 is one example infrastructure. Other infrastructures are also possible which contain more or fewer subsystems or components than shown in FIG. 1. For example, one or more of the servers or databases shown in FIG. 1 can be combined into a single server or database. As another example, Tags can be associated with assets using dedicated handheld devices.

Examples of Event Notifications During an Asset's Journey

Figure 2:
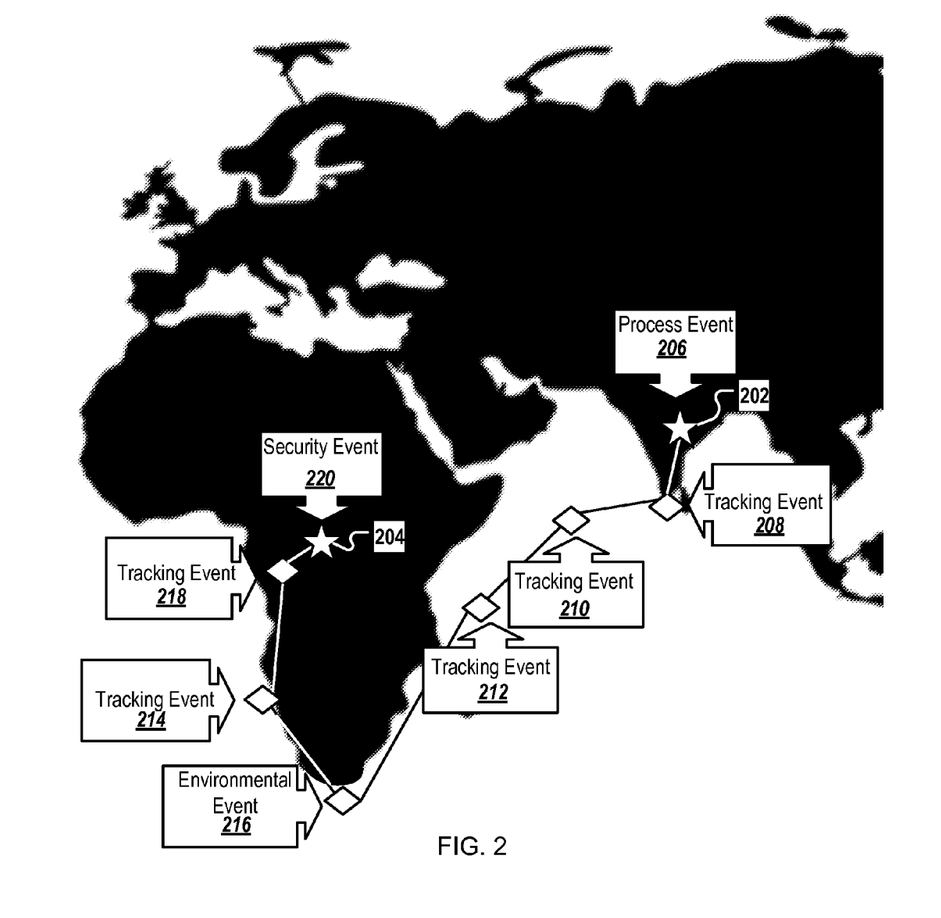
FIG. 2 illustrates the journey of an asset from a origin location to a destination location.

FIG. 2 illustrates the journey of an asset from a origin location 202 to a destination location 204. As the asset travels from the origin location 202 to the destination location 204, a Tag associated with the asset issues various event notifications. During the trip, the asset can travel on various conveyances including, but not limited to, trucks, trains, ships, and airplanes.

When the Tag is first attached to the asset, the Tag generates a process event notification 206 indicating that the Tag is being commissioned (e.g., associated with the asset) and that the Tag and the asset are beginning their journey. Process events generally occur at known locations, such as a warehouse from which the asset is being shipped. These locations can optionally be associated with geofences that define the boundaries of the locations.

As the asset continues on its journey, it periodically generates tracking event notifications (e.g., event notifications 208, 210, 212, 214, and 218). These events provide updates on the current location of the asset, and can be used by the system to obtain useful information such as the path that the asset has traveled from its origin, remaining distance or estimated time to the destination, and the current location of the asset. Some of the tracking events (e.g., tracking events 208 and 218) can be used to determine that the asset has entered or left a port or other designated area (e.g., because the location is now inside or outside a geofence associated with the designated area).

As the asset rounds the Cape of Good Hope at the southern tip of Africa, the Tag generates an environmental event notification 216. This event indicates that a particular environmental condition has either exceeded or fallen below an acceptable range.

The asset eventually arrives at the destination location 204. The asset is opened before the Tag is decommissioned, and the Tag generates a security event notification 220 indicating that the asset has been opened. In some implementations, when the system receives the security event notification 220, it checks to see if the location of the security event is inside a geofence corresponding to the destination location. If so, the system automatically determines that the asset's journey has ended. In other implementations, the Tag is decommissioned before it is opened, and the Tag generates a process event notification indicating the end of the journey instead of the security event.

Each event notification described above includes a position fix (e.g., an estimation of the asset's current position based on one or more location determination technologies such as GPS, GPRS, wireless networks, triangulation from cellular towers, or Skyhook Wireless™ technology). A system such as the tag system 100 receives and processes each event notification and provides information to end user systems (e.g., using an information service like the information service 104). The information can include event notifications (e.g., identifying the type of event, the asset, the positional fix, and the date/time of the event). The information can also include additional information extracted from or associated with the event (e.g., a map of the route taken by the asset for a location event, or an association between an event and the contents of an asset associated with the event). It is important that users be given accurate information. However, position fixes are prone to error.

Error in Position Fixes

Figure 3:
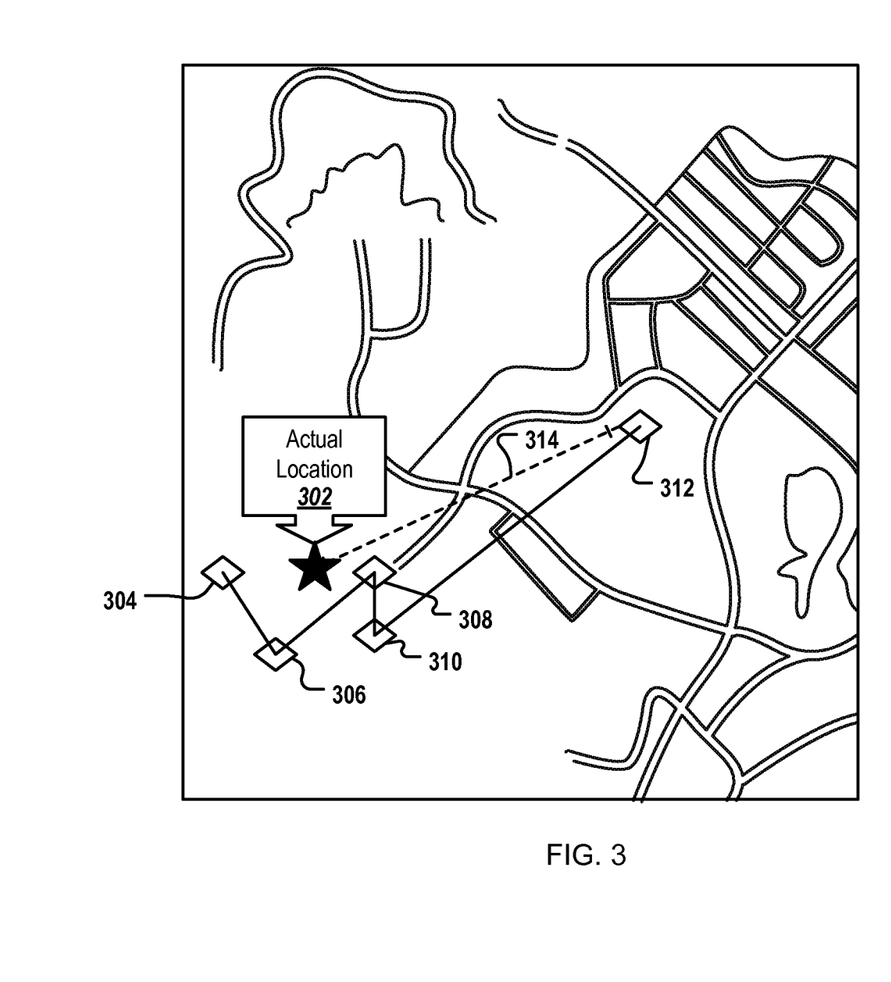
FIG. 3 illustrates an example of error in position fixes.

FIG. 3 illustrates an example of error in position fixes. An asset is stationary at its actual location 302. Over time, a series of position fixes (e.g., position fixes 304, 306, 308, 310, and 312) are taken. Most of the position fixes are only a small distance away from the actual location 302. However, position fix 312 is a greater distance (e.g., distance 314) away from the actual location 302. This distance 314 is due to error between the actual location 302 and the position fix 312.

There are several causes of error for position fixes. For example, GPS-based position fixes are determined using triangulation from satellite signals. Error can occur in the position fix when a GPS receiver cannot receive signals from enough satellites (either because not enough satellites are visible, or because tall objects, such as buildings, interfere with the signal), or when the geometry of the visible satellites is close together. Errors can also occur because when assets made of a material such as steel are stacked near each other (e.g., when the assets are stacked in a storage yard), the metal can interfere with the GPS signals. In addition, effects of the atmosphere (e.g., refraction of GPS signals passing through the ionosphere and/or troposphere), multipath effects (e.g., caused when signals take multiple paths to reach the GPS receiver), shifts in satellite orbits, and selective availability (e.g., the falsification of the time reported by the signal transmitted by the satellite) can each lead to error in GPS position fixes. Other types of location determination technology can also have errors.

Figure 4A:
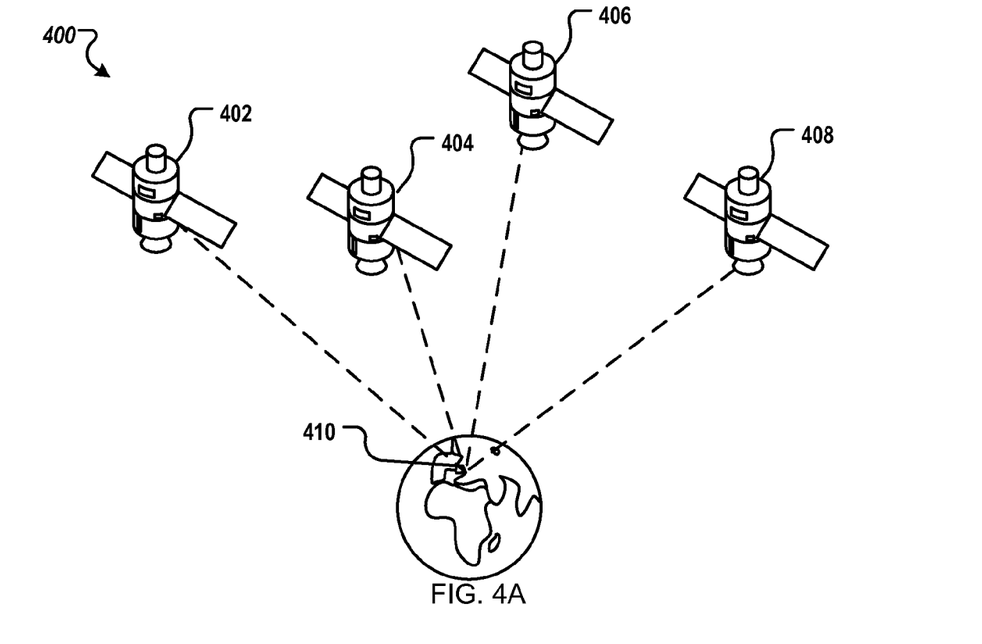
FIGS. 4A and 4B illustrate example satellite geometries.
Figure 4B:
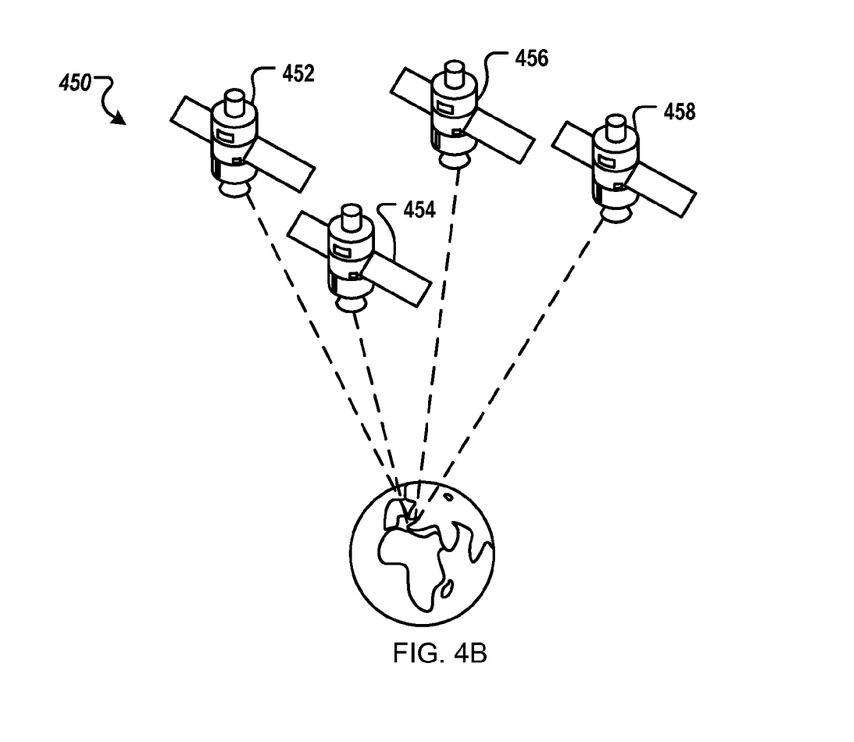

FIGS. 4A and 4B illustrate example satellite geometries 400 and 450. Different satellite geometries will have different dilution of precision (DOP). Low DOP is an indicator of low GPS error, while high DOP is an indication of high GPS error. In FIG. 4A, the satellites 402, 404, 406, and 408 are fairly evenly distributed around the location 410 where a position fix is being taken. Therefore, there will be low dilution of precision. In contrast, in FIG. 4B, the satellites 452, 454, 456, and 458 are clustered around the location 460 where the position fix is being taken. Therefore, they have a close geometry, and there will be high dilution of precision.

Various DOP values can be measured for a given position fix. For example, GPS receivers often calculate values for one or more of Horizontal DOP (HDOP) (a measure of the quality of latitude and longitude data), Vertical DOP (VDOP) (a measure of the quality of elevation data), Position DOP (PDOP) (a measure of the quality of the three-dimensional measurement) and Time DOP (TDOP) (a measure of the quality of the time determination). One or more of these can be used to estimate error due to dilution of precision.

Other parameters can also be used to estimate error in the GPS fix, for example, parameters from other satellite navigation systems such as the Wide Area Augmentation System (WAAS), the European Geostationary Navigation Overlay Service (EGNOS), the Multi-functional Satellite Augmentation System (MSAS), Galileo, the Global Navigation Satellite System (GLONASS), and the Satellite Based Augmentation System (SEAS).

Figure 5:
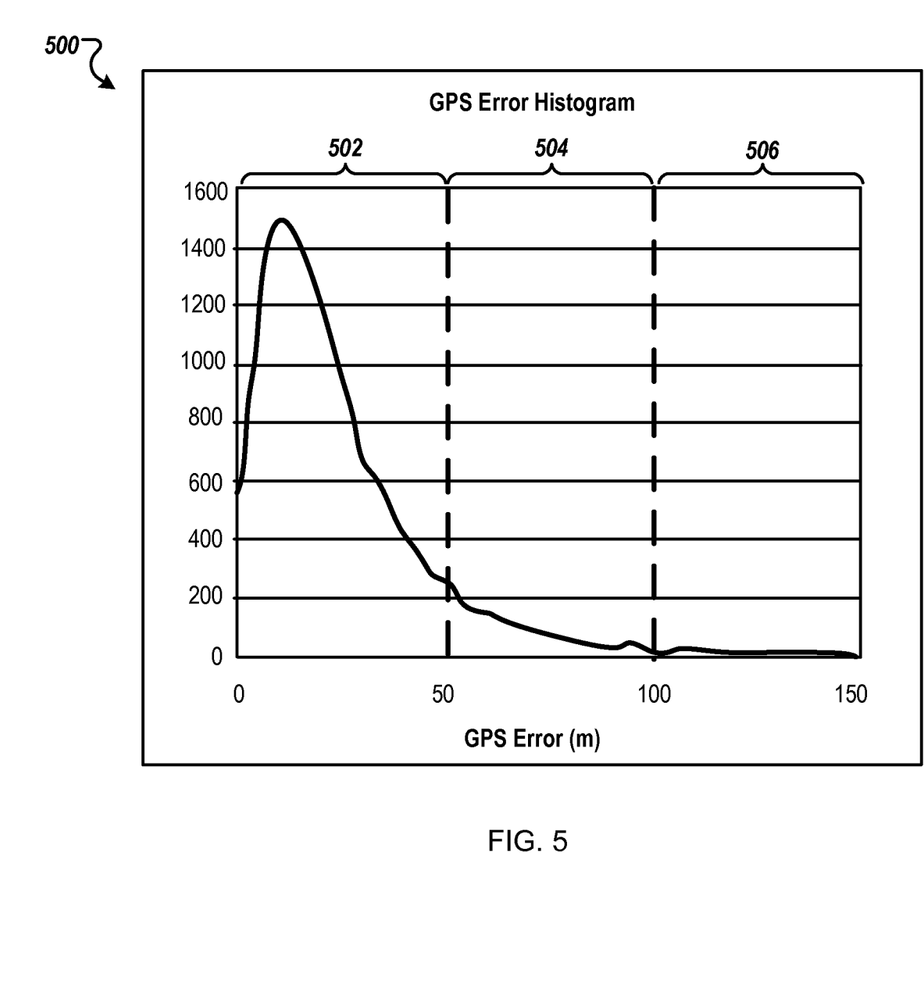
FIG. 5 is a histogram illustrating example error in GPS position fixes.

FIG. 5 is a histogram 500 illustrating example error in GPS position fixes. While FIG. 5 illustrates GPS error, other location determination techniques can have similar error histograms. As illustrated by the histogram 500, most GPS error is concentrated in the range 502 that covers small errors in position fixes (e.g., less than 50 meters). However, some error is in the range 504 that includes larger errors (e.g., 50 to 100 meters). The error has a long tail in the range 506 that extends from 100 meters past 150 meters).

Tracking systems can often tolerate low error, such as the error in ranges 502 and 504. However, tracking systems have more difficulty handling long-tail error. The techniques described below with reference to FIGS. 6 and 7 can help a tracking system handle both low and high error.

Example Process for Identifying and Correcting Inaccurate Position Fixes

Figure 6:
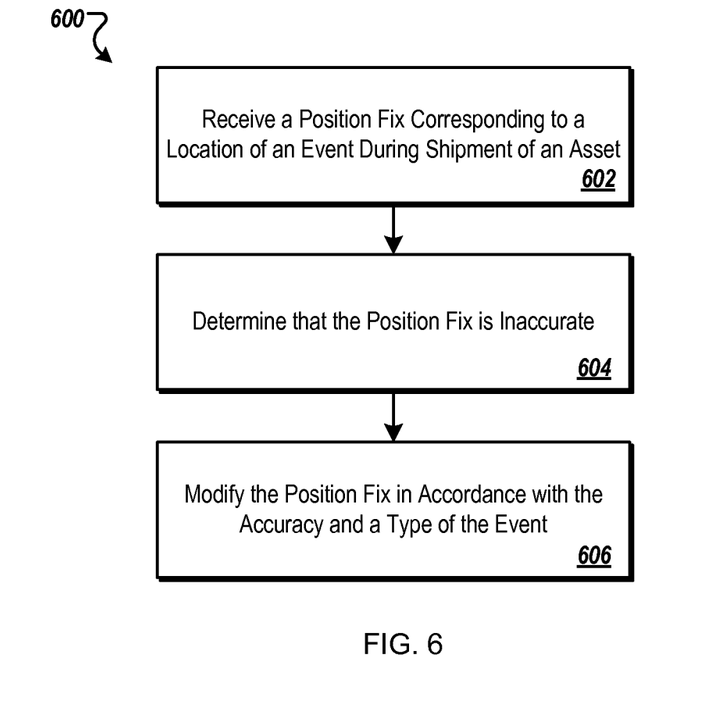
FIG. 6 is a flow diagram of an example process for identifying and correcting an inaccurate position fix.

FIG. 6 is a flow diagram of an example process 600 for identifying and correcting an inaccurate position fix. For convenience, the process will be described in reference to a system that performs the process. The system can be, for example, a Tag (e.g., Tag 111), an event server (e.g., event server 112), or a system that includes a Tag and an event server such as the tag system 100. The steps of process 600 need not occur sequentially or in the order described below.

The process 600 begins when the system receives a position fix corresponding to a location of an event during shipment of an asset (602). The position fix can be, for example, a GPS or GPRS position fix. When the system is a Tag, the position fix can be received, for example, from a GPS receiver on the Tag. When the system is an event server, the position fix can be received, for example, as part of an event notification received from a Tag associated with the asset. The events include, but are not limited to, the events described above with reference to FIGS. 1 and 2.

The system determines that the position fix is inaccurate (604) (e.g., is an outlier). The system can determine that the position fix is inaccurate based on one or more parameters. The parameters can include, for example, one or more of parameters that indicate the accuracy of the position fix, parameters that indicate a physical state of the asset, parameters that provide context for the event notification, parameters that indicate additional position fixes received from the same location-based source as the position fix, and parameters that indicate an accuracy of the position fix based on data received from a different location-based source. For example, parameters that indicate the accuracy of the position fix for a GPS-based position fix include, but are not limited to, HDOP, VDOP, PDOP, TDOP, number of satellites seen, and number of satellites used. Parameters that indicate a physical state of the asset include, but are not limited to, parameters that specify whether the asset is moving or stationary, parameters that indicate how fast the asset is moving (e.g., velocimeter readings), parameters that indicate how much the asset is accelerating (e.g., accelerometer readings), and parameters that indicate the heading direction of the asset. Parameters that provide context for the event notification include, but are not limited to, data describing the shipment of the asset and status during shipment (e.g. shipment status updates from ocean carriers, vessel sailing schedules, and train schedules, CODECO data and COARRI data). This data can describe, for example, an anticipated timeline for the shipment of the asset, an actual timeline of the shipment of the asset, and whether particular milestones during the travel of the asset have been reached. Context parameters can also include details about conveyances on which the asset is traveling, for example, ship tracking information available from an external service that aggregates ship location information. Context parameters can also include other reports of an asset's location generated by various systems that interact with the asset, for example, radiation portal monitors, RFID readers, optical character recognition (OCR) systems at gates, terminal operating systems, guard station systems, warehouse management systems, customs, etc. Parameters that indicate additional position fixes received from the location-based source can include position fixes that precede and succeed the position fix whose accuracy is being tested. Parameters that indicate the accuracy of a position fix received from a different location-based source can be generated, for example, from another receiver on the Tag (e.g., for cellular triangulation or for signals received from another source of location determination data) and can include, for example, a position fix according to the different location-based source, or a measure of the accuracy of the original position fix. The parameters from a different location-based source can optionally include parameters for the accuracy of the alternative position fix.

The system can use various heuristics to determine that the position fix is an outlier. In some implementations, the system compares one or more of the parameters to a threshold. In some implementations, the threshold for a given parameter is the same for all event types. In other implementations, the threshold is different for different event types. For example, each event can be associated with a corresponding measure of how critical the event is in the context of a typical asset's journey. For example, process and security events can be considered to have "critical" importance because process events define the beginning and end of the journey, and security events indicate that the integrity of the asset has been compromised. In contrast, environmental, tracking, and location events can be considered to have only "high" importance. The threshold for a given parameter and a given event type can be based on how critical the event type is. For example, in some implementations, more critical events can have a narrower acceptable range than less critical events, because it is important that the data for the events be accurate. In alternative implementations, more critical events can have a broader acceptable range than less critical events, because it is important that the event notification be received, even if the data is slightly inaccurate.

In some implementations, the measure of how critical the event is can be further based on the needs of the user. For example, if the contents of the asset are extremely temperature sensitive, then environmental events can have a low threshold, so that they will be reported even when the position fix is inaccurate. In some implementations, the measure of how critical the event is can also be further based on the anticipated conditions during the journey of the asset. For example, if the asset is traveling through trade lanes known to have rapid temperature changes, and the contents of the asset are temperature sensitive, then environmental events can be considered more critical.

In other implementations, the system uses contextual clues to identify position fixes that are outliers. For example, if the context of the asset's shipment indicates that it should be in one location, but the position fix is in a different location, the system can identify the position fix as an outlier. For example, if an asset has been flagged for inspection by customs, then the system can identify position fixes that are not headed towards a known customs inspection location as an outlier. As another example, if an asset has been discharged (e.g., has been unloaded from a ship), then any position fixes that indicate that the asset is in the ocean are outliers.

In other implementations, the system compares the position fix to a preceding and/or succeeding position fix and determines that the position fix is an outlier when the physical distance between the position fix and either the preceding or succeeding position fix exceeds a threshold. In some implementations, when the position fixes indicate that the asset is not moving the threshold can be determined from an accuracy factor for the device used to generate the second position fix. For example, if the distance between the readings exceeds the accuracy factor for the device, the system can determine that the position fix is an outlier. The position fixes can indicate that an asset is not moving, for example, when the velocimeter readings and/or accelerometer readings for the position fixes indicate a velocity and/or acceleration of zero, or when variables received as part of the position fix, such as ground speed or heading direction, have a value of zero. For example, an asset is not moving when it is sitting in a port waiting to be loaded onto a ship.

In some implementations, when the asset is moving (e.g., as indicated by accelerometer data, velocimeter data, or position fix data for variables such as ground speed or heading direction), the threshold can be determined from a distance (e.g., a maximum distance, an average distance, or a likely distance) that the asset could have traveled between position fixes. For example, the system can determine the distance traveled between the position fix and the subsequent position fix by multiplying a speed of the asset at the position fix by the time between the fixes. Alternatively, the system can use other contextual information about the location of the asset to determine the distance the asset could have traveled. For example, if the system knows that the asset is on a particular type of conveyance (e.g. a particular type of ship or a particular type of airplane), the system can retrieve data about the maximum (or average) speed of the conveyance, for example, by retrieving the speed data from a conveyance database. The system can then determine the distance by multiplying the speed of the conveyance type by the time between fixes. As another example, the system can use data on average speeds in a given location to determine the likely speed of the asset, and determine the distance by multiplying the average speed by the time between fixes. As another example, the distance can be the maximum distance any conveyance (or any commonly used conveyance) could travel during the time between fixes.

In some implementations, when the system determines that the asset is not moving (for example, as described above), the system plots previously received position fixes (e.g., position fixes for the current and previous session between the event server and the Tag where the asset was also not moving) and identifies the center of a cluster of the fixes (e.g., using k-means clustering or other clustering algorithms). If the position fix falls outside a given radius from the center, the position fix is an outlier. The radius can be determined, for example, based on known error in the position fix technology used in the Tag. For example, if the Tag has an error of no more than 200 feet with 99% confidence, the radius can be 200 feet.

In some implementations, when the system determines that the asset is moving, the system plots previously received position fixes and identifies a projected path for the asset (e.g., using a Rayleigh distribution). The current position fix is then evaluated against the projected path of the asset, and if the position fix differs from the path by more than a threshold radius, the position fix is considered an outlier. The radius can be determined, for example, based on known error in the position fix technology used in the Tag.

In some implementations, when a given position fix indicates that an asset has entered (or left) a geofenced area, the system can determine whether the given position fix is an outlier by considering one or more subsequent position fixes. If the subsequent position fixes also indicate that the asset has entered (or left) the geofenced area, the given position fix is considered accurate. Otherwise, the given position fix is an outlier.

In other implementations, the system determines that a position fix is an outlier by comparing the position fix to both a preceding and subsequent position fix. For example, if three position fixes (p1, p2, and p3) are taken over time, and the distance between p1 and p2 plus the distance between p2 and p3 is greater than the distance between p1 and p3, the system can determine that p2 is an outlier. Alternatively, if the three position fixes all indicate that the asset is traveling in one direction (e.g., north), but p2 is in the opposite direction from p1 (e.g., south), and p3 is far enough away from p1 that the asset could not have traveled south between p1 and p2, and then north to get to p3, the system can determine that p2 is an outlier.

In other implementations, the system determines that a position fix is an outlier based on contextual data regarding shipment of the asset. For example, when the position fix corresponds to an asset entering or leaving a geofenced area, the system can compare the time of the position fix to data about when the asset was supposed to enter or leave the geofenced area. The system can determine the time the asset was supposed to enter or leave the geofenced area, for example, from one or more of the contextual parameters for the position fix. Alternatively, or additionally, the system can compare the position indicated by the position fix to the position of the conveyance on which the tag is supposed to travel. If the position indicated by the position fix does not match up with contextual information, the position fix can be determined to be an outlier.

The system modifies the position fix in accordance with a type of the event (606). In general, the system uses business logic appropriate for the type of event to determine how the position fix should be modified In some implementations, the event is a process event indicating a given shipping event has occurred. In these implementations, the system applies business logic that says that shipment events of the same type as the given shipping event frequently occur at a valid location. Valid locations can be, for example, locations that the system knows should be associated with shipment events of the given type. For example, begin and end journey events should always occur at valid origin or destination locations. Therefore, if the position fix is close enough to a valid origin or destination location (depending on whether the process event indicates the beginning or end of the journey) for the shipment, then that is likely where the asset actually is. To carry out this logic, the system tries to identify a valid origin or destination location within a threshold radius (e.g., 100 meters) from the position indicated by the position fix. The threshold can be determined, for example, based on the error range of position fixes. For example, the threshold can be determined empirically by measuring the worst outlier in position fixes for Tags during field trials. The origin or destination location can be identified, for example, from a geofence associated with the location. In some implementations, the valid origin or destination location is an origin or destination location associated with the specific asset being tracked. In other implementations, when the specific origin or destination location for the specific asset is not in range, the system can instead use any valid origin or destination location associated with the user (e.g., any origin location used by the user or any destination location used by the user). Similar valid locations can be identified for other events. For example, customs inspections should always occur within a known region in a port or terminal. Therefore, for a customs inspection event, the system can attempt to identify a valid customs location within range of the position fix. Other techniques for identifying a valid location can also be used, for example, selecting the closest valid location to the position fix. If the system does identify a valid location, the system then modifies the position fix to be the valid location.

In some implementations, the event is a security event (e.g., indicating that the asset has potentially been compromised). In these implementations, the system applies business logic that says that security events often occur at an asset's destination location (e.g., because the asset is opened when it arrives at its final destination). To carry out this logic, the system tries to identify a valid destination location within a threshold radius (e.g., 100 meters) from the position indicated by the position fix. If there is a valid destination location within the radius, the system modifies the position fix to indicate a location of the destination location. In some implementations, the system may also confirm that the time of the security event is close to an arrival time specified in contextual data for the shipment. In some implementations, the system alternatively, or additionally, applies business logic that says that security events often occur when an asset is being inspected by customs. Based on contextual information for the shipment (e.g., that the asset arrived in a port and has not left the port, and optionally has not been loaded onto a conveyance), the system can determine that the security event likely occurred in customs and correct the position fix to indicate the designated customs area inside the port.

In some implementations, the event is an environmental event (e.g., indicating that an environmental condition of the container is no longer in an acceptable range). In these implementations, the system applies business logic that says that the exact location of the environmental event is not critical, and therefore the system can use the location of the last position fix that satisfies the threshold for environmental events. The system modifies the position fix data accordingly.

In some implementations, the event is a tracking event (e.g., indicating a position of the asset). In these implementations, the system applies business logic that says that using multiple position fixes over time leads to a more accurate position fix than a single position fix. The system therefore combines a number of past position fixes (e.g., the past five fixes, or all fixes received in the last two hours), and modifies the position fix to be the average. For example, the system can average the position fixes, take a weighted average of the position fixes, take the median of the position fixes, apply the central limit theorem to the position fixes, interpolate a position fix from the position fixes, or extrapolate a position fix from the position fixes. When calculating a weighted average, the system can weight the position fixes, for example, by their deviation from the average, median, or mode fix. When interpolating a position fix, the system can estimate what an outlier position fix should be based on preceding and succeeding position fixes, and optionally the speed of the asset at each position fix. When extrapolating a position fix, the system can estimate what an outlier position fix should be based on preceding position fixes and the speed of the asset at those position fixes.

In some implementations, the business logic corresponding to the various events does not lead to the selection of an updated location for the position fix. In these implementations, the system can apply one or more default procedures. In some implementations, the system can use dead reckoning to estimate the current location of the asset. Dead reckoning can include using one or more last received position fixes for the asset, an estimated speed of the asset, and the time between fixes to estimate the next position for the asset. Dead reckoning can also include projecting a path for the asset, for example, using a Rayleigh distribution, as described above, and then selecting an appropriate location on the path (or a location within a threshold radius of the appropriate location on the path). In other implementations, the system uses dead reckoning and then selects a valid location for the event (e.g., a origin location for a process event or a destination location for a security event) that is closest to the dead reckoning location.

Alternatively, the system can combine a number of past position fixes, for example, as described above with reference to tracking events. In some implementations, for events that are deemed less critical (e.g., tracking events), the system may ignore the position fix and not make any further attempts to use or modify the position fix; alternatively, the system may use the last known valid location for the asset, instead of the inaccurate position fix.

In some implementations, the system generates a notification identifying the asset, the event, and the modified position fix, and provides the notification to a user. The notification can optionally identify that the position fix has been modified. When the system includes the event server, the event server can provide the notification to the user, for example, by sorting or sequencing reports received from Tags and forwarding them to a tracking application operated by an information service (e.g., the information service 104). The event server can also format the reports to comply with processing logic of the tracking application. When the system includes just a Tag, the Tag can provide the notification to the user, for example, by forwarding the notification to the event server. The event server will then forward the notification on to the tracking service of the information service.

The features described above can be implemented in digital electronic circuitry, or in computer hardware, firmware, software, or in combinations of them. The features can be implemented in a computer program product tangibly embodied in a computer readable medium, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
    receiving, at a computing device, a first position fix for an asset, the first position fix corresponding to a first location of the asset determined when an event of a predefined event type occurred during shipment of the asset;
    determining, by the computing device, if the first position fix is inaccurate by comparing the first location to a second location where the event was expected to occur; and
    if the first position fix is inaccurate, determining if the expected location of the event is within a threshold distance of the first position fix; and modifying, by the computing device, the first position fix to correspond to the expected location of the first event when the expected location is within a threshold distance of the first position fix.

2. The method of claim 1, further comprising:
generating a notification identifying the asset, the event, and the modified first position fix; and
providing the notification to a user.

3. The method of claim 1, wherein modifying the first position fix comprises:
determining that the type of the first event is a shipping event;
identifying the expected location, the expected location being a valid location for the shipping event; and
modifying the first position fix to indicate the expected location.

4. The method of claim 3, wherein the shipping event is that the shipment is beginning, and identifying the expected location comprises:
determining whether a valid origin location for the shipment is within a threshold distance of the first position fix; and
identifying the valid origin location as the valid location if the valid origin location is within a threshold distance of the first position fix, and otherwise identifying an origin location associated with a sender of the shipment.

5. The method of claim 3, wherein the shipping event is that the shipment is ending, and identifying the expected location comprises:
determining whether a valid destination location for the shipment is within a threshold distance of the first position fix; and
identifying the valid destination location as the valid location if the valid destination location is within a threshold distance of the first position fix, and otherwise identifying a destination location associated with a receiver of the shipment.

6. The method of claim 1, wherein modifying the first position fix comprises:
determining that the type of the first event is an environmental event indicating that an environmental requirement for the asset has been violated; and
modifying the first position fix to be a last received position fix having an accuracy score that satisfies the threshold value for events having the type environmental event.

7. A system, comprising:
a tag configured to perform operations comprising:
receiving position fix data for an asset; and
generating notifications identifying position fixes for events during shipment of the asset;
one or more servers configured to perform operations comprising:
receiving a first position fix for the asset from the tag, the first position fix corresponding to a first location of the asset determined when a first event of a predefined event type occurred during shipment of the asset;
determining if the first position fix is inaccurate by comparing the first location to a second location where the event was expected to occur; and
if the first position fix is inaccurate, determining if the expected location of the event is within a threshold distance of the first position fix; and
modifying the first position fix to correspond to the expected location of the first event when the expected location is within a threshold distance of the first position fix.

8. The system of claim 7, wherein modifying the first position fix comprises:
determining that the type of the first event is a shipping event;
identifying the expected location, the expected location being a valid location for the shipping event; and
modifying the first position fix to indicate the expected location.

9. The system of claim 8, wherein the shipping event is that the shipment is beginning, and identifying the expected location comprises:
determining whether a valid origin location for the shipment is within a threshold distance of the first position fix; and
identifying the valid origin location as the valid location if the valid origin location is within a threshold distance of the first position fix, and otherwise identifying an origin location associated with a sender of the shipment.

10. The system of claim 8, wherein the shipping event is that the shipment is ending, and identifying the expected location comprises:
determining whether a valid destination location for the shipment is within a threshold distance of the first position fix; and
identifying the valid destination location as the valid location if the valid destination location is within a threshold distance of the first position fix, and otherwise identifying a destination location associated with a receiver of the shipment.

11. A system, comprising:
a tag configured to perform operations comprising:
receiving position fix data for an asset; and
generating notifications identifying position fixes for events during shipment of the asset;
one or more servers configured to perform operations comprising:
receiving a first position fix for the asset from the tag, the first position fix corresponding to a first location of the asset determined when a first event of a predefined event type occurred during shipment of the asset;
determining if the first position fix is inaccurate by comparing the first location to a second location where the event was expected to occur; and
if the first position fix is inaccurate, modifying the first position fix to correspond to the expected location of the first event, wherein modifying the first position fix comprises:
determining that the type of the first event is an environmental event indicating that an environmental requirement for the asset has been violated; and
modifying the first position fix to be a last received position fix having an accuracy score that satisfies the threshold value for events having the type environmental event.

12. The system of claim 7, wherein modifying the first position fix comprises:
determining that the type of the first event is a security event indicating that the asset has been compromised;
determining that the first location is within a threshold distance of a destination location for the asset; and
modifying the first position fix to be the destination location for the asset.

13. A system, comprising:
a tag configured to perform operations comprising:
receiving position fix data for an asset; and
generating notifications identifying position fixes for events during shipment of the asset;

one or more servers configured to perform operations comprising:
  receiving a first position fix for the asset from the tag, the first position fix corresponding to a first location of the asset determined when a first event of a predefined event type occurred during shipment of the asset;
  determining if the first position fix is inaccurate by comparing the first location to a second location where the event was expected to occur; and
  if the first position fix is inaccurate, modifying the first position fix to correspond to the expected location of the first event, wherein modifying the first position fix comprises:
determining that the type of the first event is a security event indicating that the asset has been compromised;
determining that the first location is within a threshold distance of a customs inspection location; and
modifying the first position fix to be the customs inspection location.

14. The method of claim 1, wherein modifying the first position fix comprises:
  determining that the type of the first event is a security event indicating that the asset has been compromised;
  determining that the first location is within a threshold distance of a destination location for the asset; and
  modifying the first position fix to be the destination location for the asset.

15. A computer-implemented method, comprising:
receiving, at a computing device, a first position fix for an asset, the first position fix corresponding to a first location of the asset determined when an event of a predefined event type occurred during shipment of the asset;
determining, by the computing device, if the first position fix is inaccurate by comparing the first location to a second location where the event was expected to occur; and
if the first position fix is inaccurate, modifying, by the computing device, the first position fix to correspond and to the expected location of the first event, wherein modifying the first position fix comprises:
determining that the type of the first event is a security event indicating that the asset has been compromised;
determining that the first location is within a threshold distance of a customs inspection location; and
modifying the first position fix to be the customs inspection location.

\* \* \* \* \*

UNITED STATES PATENT AND TRADEMARK OFFICE
CERTIFICATE OF CORRECTION

PATENT NO. : 8,432,274 B2  
APPLICATION NO. : 12/533913  
DATED : April 30, 2013  
INVENTOR(S) : Nicholas D. Cova and Narayana C. Krishna It is certified that error appears in the above-identified patent and that said Letters Patent is hereby corrected as shown below:

In the Claims

Column 16, Line 16 at Claim 15; replace:
"and to the expected location of the first event, wherein" with
-- to the expected location of the first event, wherein --

Signed and Sealed this
Twentieth Day of August, 2013

Teresa Stanek Rea
*Acting Director of the United States Patent and Trademark Office*